(12) United States Patent
Kil et al.

(10) Patent No.: US 9,294,312 B2
(45) Date of Patent: Mar. 22, 2016

(54) APPARATUS AND METHOD FOR ESTIMATING DOPPLER SPREAD IN MOBILE COMMUNICATION SYSTEM

(75) Inventors: Ki-Ho Kil, Seoul (KR); Hun-Kee Kim, Seoul (KR); Min-Ho Shin, Suwon-si (KR)

(73) Assignee: Samsung Electronics Co., Lt., Suwon-si (KR)

( * ) Notice: Subject to any disclaimer, the term of this patent is extended or adjusted under 35 U.S.C. 154(b) by 209 days.

(21) Appl. No.: 13/557,689

(22) Filed: Jul. 25, 2012

(65) Prior Publication Data
US 2013/0034140 A1 Feb. 7, 2013

(30) Foreign Application Priority Data
Aug. 4, 2011 (KR) .................. 10-2011-0077645

(51) Int. Cl.
*H03K 9/00* (2006.01)
*H04L 25/02* (2006.01)
*H04L 27/00* (2006.01)
*H04L 27/26* (2006.01)

(52) U.S. Cl.
CPC .......... *H04L 25/022* (2013.01); *H04L 27/0014* (2013.01); *H04L 27/2659* (2013.01)

(58) Field of Classification Search
CPC .......................... H04B 17/345; H04L 25/022
USPC ............... 375/346, 254, 285, 316; 455/296
See application file for complete search history.

(56) References Cited

U.S. PATENT DOCUMENTS

2011/0098073 A1* 4/2011 Park et al. .................. 455/509
2011/0158343 A1* 6/2011 Park et al. .................. 375/285

FOREIGN PATENT DOCUMENTS

KR 10-2009-0083003 A 8/2009

* cited by examiner

*Primary Examiner* — Leila Malek
(74) *Attorney, Agent, or Firm* — Jefferson IP Law, LLP

(57) ABSTRACT

An apparatus and a method for estimating a Doppler frequency in a mobile communication system are provided. The apparatus includes an estimator for temporarily estimating a maximum Doppler frequency based on channel values sampled according to a first period in a frame, a detector for calculating at least one correlation value between at least one channel value additionally sampled in the frame and at least one channel value sampled over the first period, and for determining whether aliasing occurs based on the correlation value, and a determiner for determining a final maximum Doppler frequency according to the occurrence or non-occurrence of the aliasing.

18 Claims, 7 Drawing Sheets

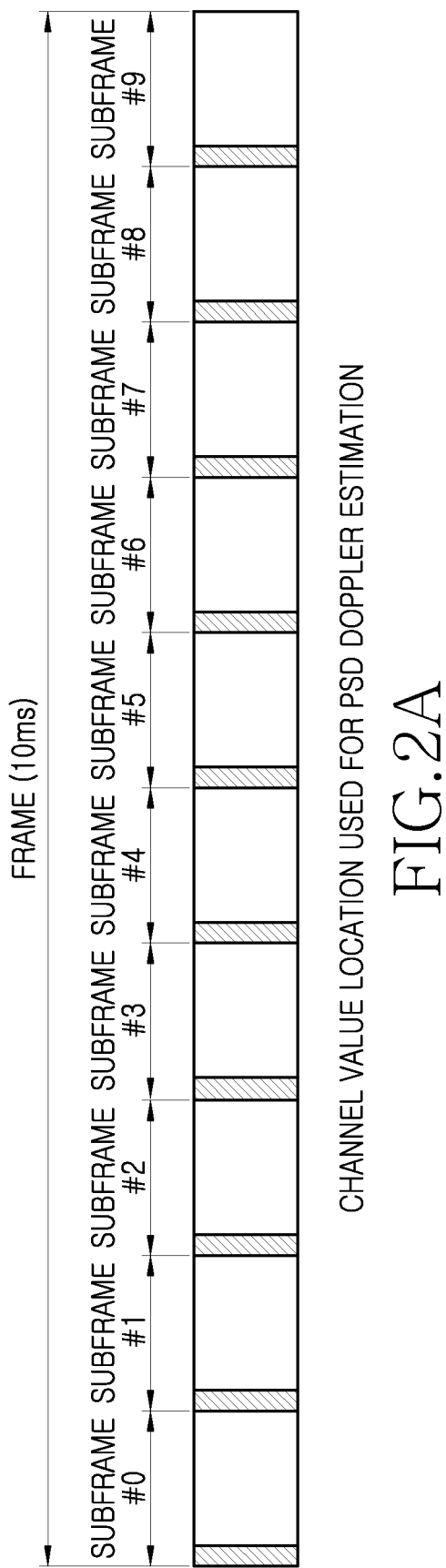
FIG.2A — CHANNEL VALUE LOCATION USED FOR PSD DOPPLER ESTIMATION
FIG.2B — CHANNEL VALUE LOCATION USED FOR CORRELATION FOR ACF

APPARATUS AND METHOD FOR ESTIMATING DOPPLER SPREAD IN MOBILE COMMUNICATION SYSTEM

PRIORITY

This application claims the benefit under 35 U.S.C. §119(a) of a Korean patent application filed on Aug. 4, 2011 in the Korean Intellectual Property Office and assigned Serial No. 10-2011-0077645, the entire disclosure of which is hereby incorporated by reference.

BACKGROUND OF THE INVENTION

1. Field of the Invention

The present invention relates to Doppler spread estimation in a wireless communication system. More particularly, the present invention relates to an apparatus and a method for estimating a Doppler frequency in a wireless mobile communication system.

2. Description of the Related Art

In a wireless mobile communication system, a signal is scattered, reflected, and attenuated due to obstacles, such as a building, a vehicle, or geographic features, and propagates as a multipath signal having multi-delay. In the multipath propagation environment, when a receiver, for example, a terminal moves, the phase of the multipath signal components arriving at the terminal varies and thus the received signal is subject to Doppler spread. The relationship between a velocity of the terminal and a maximum value of the Doppler spread is expressed as Equation (1).

$$v = \frac{c \cdot f_m}{f_c} \quad (1)$$

In Equation (1), v denotes the velocity of the terminal, c denotes the velocity of light, $f_m$ denotes a maximum Doppler frequency, and $f_c$ denotes a subcarrier frequency.

To accurately detect the channel change according to the movement of the terminal and to adaptively set the bandwidth of filters used in the receiver, the wireless mobile communication system estimates the Doppler frequency according to the velocity of the terminal using one of a variety of methods. For example, the related art provides methods for estimating the Doppler frequency using Zero-Crossing-Rate (ZCR), Level-Crossing-Rate (LCR), Auto-Correlation-Function (ACF), and COVariance (COV). Herein, the ZCR method and the LCR method estimate the maximum Doppler frequency using the zero crossing or the level crossing of a random fading signal, the ACF method estimates the maximum Doppler frequency using an auto-correlation function of the receive signal, and the COV method estimates the maximum Doppler frequency using the covariance of the received signal power. However, while such methods for estimating the maximum Doppler frequency offer an adequate estimation performance when a Signal to Noise Ratio (SNR) is high, the estimation performance is degraded in the low-SNR environment where the noise power is equal to the signal.

A Doppler estimation method using Power Spectral Density (PSD) is also provided. The PSD method directly calculates the power spectrum of the channel by applying a Fast Fourier Transform (FFT) to the channel value of a continuous pilot channel transmitted in the time domain. However, this method requires the additional FFT in a Code Division Multiple Access (CDMA) system, which increases hardware complexity and based on the additional computation.

By contrast, as an Orthogonal Frequency Division Multiplexing (OFDM) system basically performs the FFT, there is no need to add the FFT means to obtain the power spectrum. Accordingly, the method using the power spectrum determined using the FFT is suitable for the OFDM system. Still, since the pilot is inserted to some subcarriers of the frequency domain in the OFDM system, it is not easy to directly use the pilot in the time domain.

Therefore, a need exists for an apparatus and a method for estimating a Doppler frequency in a mobile communication system.

SUMMARY OF THE INVENTION

Aspects of the present invention are to address at least the above-mentioned problems and/or disadvantages and to provide at least the advantages described below. Accordingly, an aspect of the present invention to provide an apparatus and a method for estimating a Doppler frequency in a mobile communication system.

Another aspect of the present invention is to provide an apparatus and a method for estimating a Doppler frequency in a mobile communication system based on Orthogonal Frequency Division Multiplexing (OFDM).

Another aspect of the present invention is to provide an apparatus and a method for determining whether aliasing occurs when estimating a Doppler frequency in a mobile communication system.

In accordance with an aspect of the present invention, an apparatus for estimating a Doppler frequency in a mobile communication system is provided. The apparatus includes an estimator for temporarily estimating a maximum Doppler frequency based on channel values sampled according to a first period in a frame, a detector for calculating at least one correlation value between at least one channel value additionally sampled in the frame and at least one channel value sampled over the first period, and for determining whether aliasing occurs based on the correlation value, and a determiner for determining a final maximum Doppler frequency according to the occurrence or non-occurrence of the aliasing.

In accordance with another aspect of the present invention, a method for estimating a Doppler frequency in a mobile communication system is provided. The method includes temporarily estimating a maximum Doppler frequency based on channel values sampled according to a first period in a frame, calculating at least one correlation value between at least one channel value additionally sampled in the frame and at least one channel value sampled over the first period, determining whether aliasing occurs based on the correlation value, and determining a final maximum Doppler frequency according to the occurrence or non-occurrence of the aliasing.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 2A and 2B illustrate channel values used for Doppler estimation in a mobile communication system according to exemplary embodiments of the present invention;

Throughout the drawings, like reference numerals will be understood to refer to like parts, components and structures.

DETAILED DESCRIPTION OF EXEMPLARY EMBODIMENTS

Figure 1:
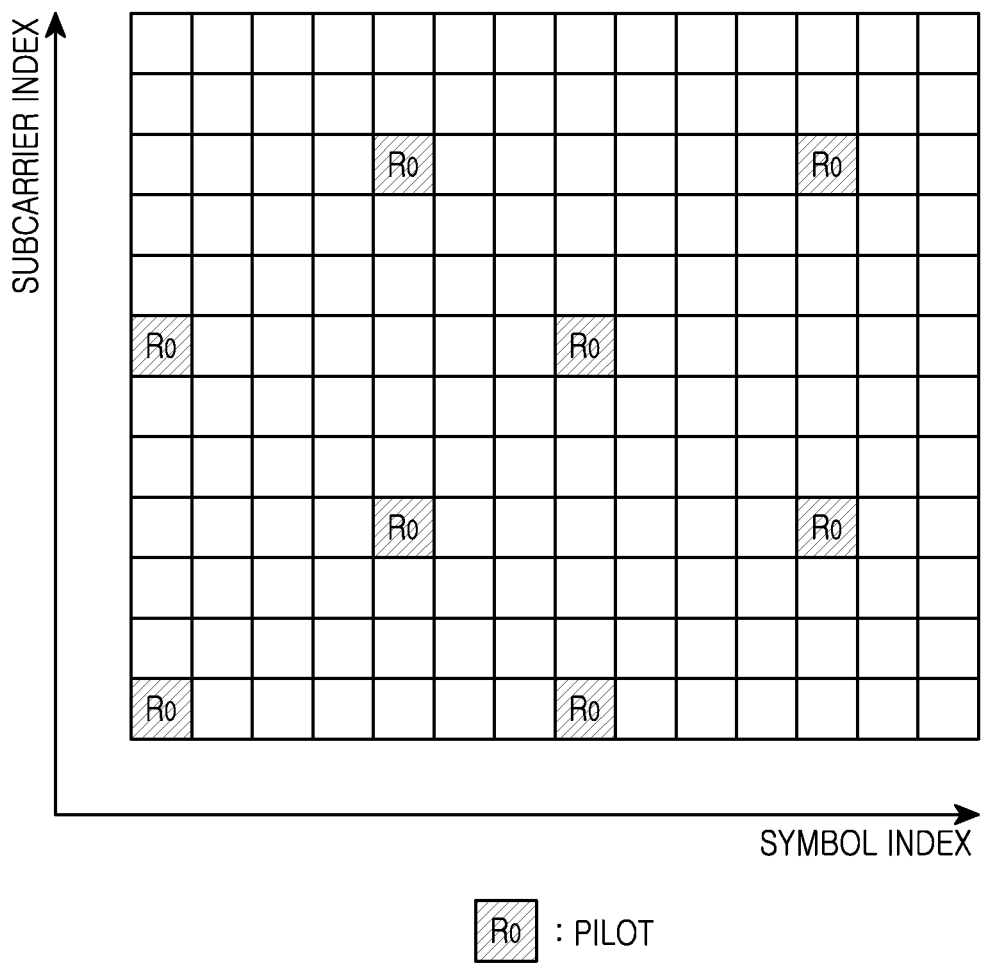
FIG. 1 illustrates distribution of reference signals in a mobile communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention relate to an apparatus and a method for estimating a Doppler frequency in a wireless mobile communication system based on Orthogonal Frequency Division Multiplexing (OFDM).

Exemplary embodiments of the present invention provide a technique for estimating a Doppler frequency in a mobile communication system. Hereinafter, an OFDM/Orthogonal Frequency Division Multiple Access (OFDMA) wireless communication system is explained by way of example. To ease the understanding, terms defined in, but not limited to, Long Term Evolution (LTE) standard are used. Exemplary embodiments of the present invention are equally applicable to other systems.

FIGS. 1 through 7, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 illustrates distribution of reference signals in a mobile communication system according to an exemplary embodiment of the present invention. For example, FIG. 1 illustrates a pilot allocation of an antenna port 0 when a normal Cyclic Prefix (CP) is used in a Frequency Division Duplex (FDD) LTE system having system bandwidth of 10 MHz.

Referring to FIG. 1, one subframe includes 14 OFDM symbols. A reference signal symbol including the pilot is at symbol indexes 0, 4, 7 and 11. Herein, the length of the subframe can be 1 ms. Each reference signal symbol includes one pilot per 6 subcarriers. In the bandwidth of 10 MHz, 100 pilots are allocated to one reference signal symbol by repeatedly, for 50 times, allocating two pilots to the same location per 12 subcarriers in the frequency axis.

When the subframe length is 1 ms and an Inverse Fast Fourier Transform (IFFT) of 1024 size is applied by inputting the frequency domain channel value in the reference signal symbol of the symbol indexes 0 and 7 for Power Spectral Density (PSD) peak detection, the time-domain channel values are sampled at the rate of 2 kHz. In this case, the estimative maximum Doppler frequency value is 1 kHz. However, when the time-domain channel values are calculated after extracting and IFFT-operating two frequency-domain channel values per subframe and detecting a valid multipath, the computation increases. Thus, an exemplary embodiment of the present invention samples the channel values at the rate of 1 kHz by sampling the channel values only in the symbol index 0, that is, by sampling only one channel value per subframe.

FIGS. 2A and 2B illustrate channel values used for Doppler estimation in a mobile communication system according to exemplary embodiments of the present invention.

Referring to FIG. 2A, one channel estimation value is extracted per subframe so as to estimate the Doppler frequency according to the PSD peak detection. In the OFDM system, the channel estimation is conducted in the frequency axis. Accordingly, an exemplary embodiment of the present invention obtains an impulse response of the channel by converting the channel estimation value of the frequency axis to the time-axis channel estimation value using the IFFT. In FIG. 2A, as the sampling period of the channel estimation value is 1 ms, the estimative maximum Doppler frequency value is 500 MHz. Yet, the LTE system needs to expand the Doppler frequency range used for estimation and estimate the Doppler frequency up to 900 MHz. Thus, an exemplary embodiment of the present invention expands the Doppler frequency estimation range up to 1 kHz through aliasing detection.

An exemplary embodiment of the present invention adopts an Auto-Correlation-Function (ACF) for the aliasing detection. The ACF calculates a normalized time correlation value of the frequency-domain channel, and estimates the maximum Doppler frequency by applying the correlation value to an inverse Bessel function. In so doing, the channel estimation values used to calculate the correlation value for the aliasing detection are shown in FIG. 2B.

Referring to FIG. 2B, the channel estimation values used to calculate the correlation value are sampled at the half time intervals of the channel estimation values used to detect the PSD peak. However, to minimize the computational increase, the channel estimation values used to calculate the correlation value are sampled only in some subframes. FIG. 2B depicts two channel estimation values in two subframes #0 and #5. As the number of the subframes from which the channel estimation values are extracted increases, the accuracy of the aliasing determination increases but the computation also increases. According to an exemplary implementation, the channel estimation values can be extracted from one or three or more subframes by considering the accuracy and the computation.

In a radio channel, the relationship between the normalized time correlation value of the frequency domain channel and the Bessel function is given by Equation (2).

$$R(mT_s) = \frac{Re\left(\frac{1}{N}\sum_{k=1}^{N}(H_p(k) \cdot H_p^*(k+m))\right)}{\frac{1}{N}\sum_{k=1}^{N}|H_p(k)|^2} = J_0(2\pi f_d mT_s) \quad (2)$$

In Equation (2), $R(mT_s)$ denotes the normalized time correlation value, N denotes the number of pilot pairs used for the correlation, $H_p(k)$ denotes the channel estimation value of the symbol index k, m denotes the symbol interval of the pilot pair used for the correlation, $J_0$ denotes the zero-order Bessel function of the first kind, $f_d$ denotes the maximum Doppler frequency, and $T_s$ denotes the duration of one symbol. An exemplary process using the Bessel function of Equation (2) is now explained.

Figure 3:
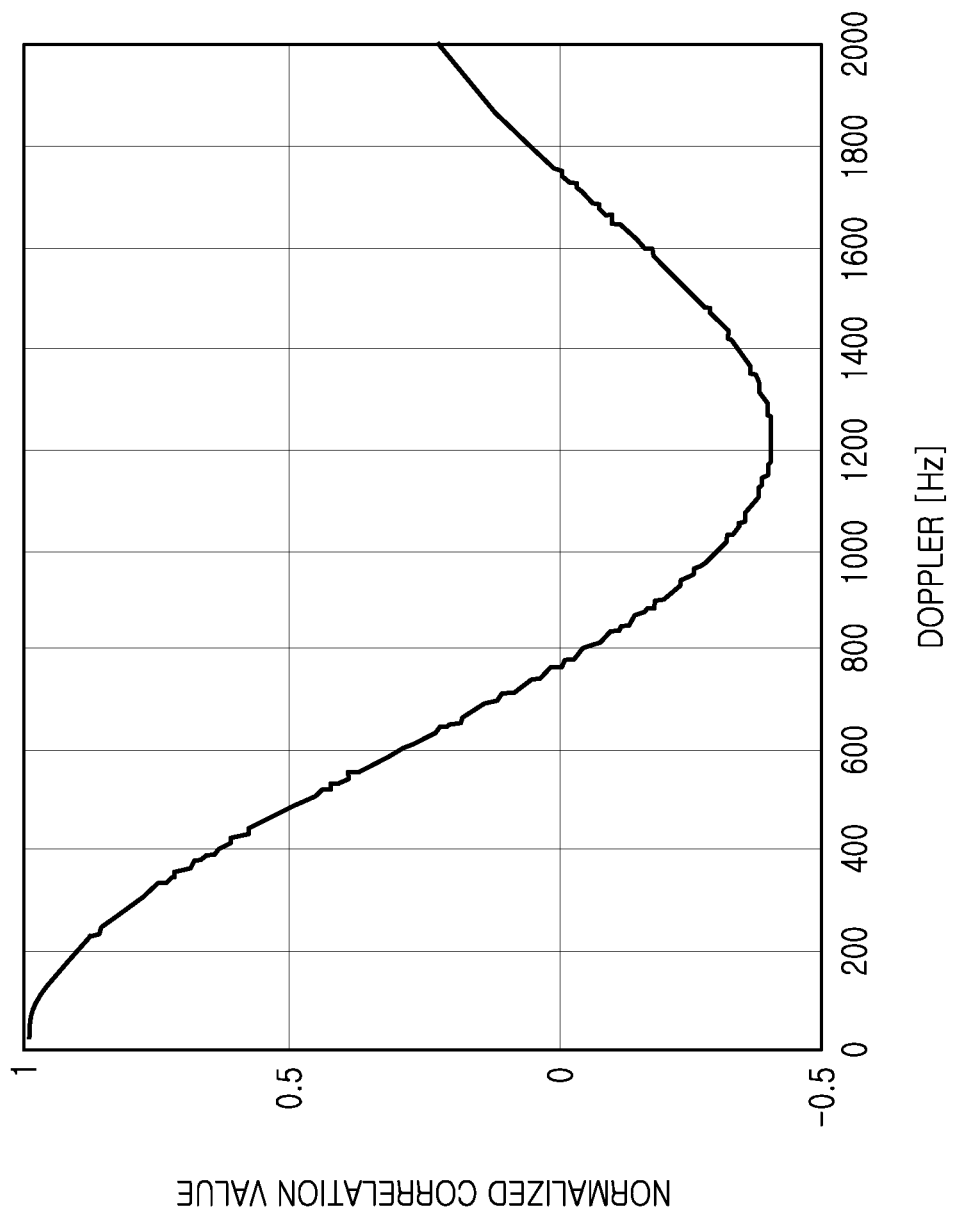
FIG. 3 illustrates a Bessel function indicating a relationship of a normalized correlation value and a Doppler frequency in a mobile communication system according to an exemplary embodiment of the present invention.

FIG. 3 illustrates a Bessel function indicating a relationship of a normalized correlation value and a Doppler frequency in a mobile communication system according to an exemplary embodiment of the present invention. FIG. 3 depicts the Bessel function when $mT_s$ is 0.5 ms.

Referring to FIG. 3, the horizontal axis indicates the Doppler frequency, which is $f_d$ in Equation (2), and the vertical axis indicates the normalized time correlation value, which is $R(mT_s)$ in Equation (2). In the Bessel function of FIG. 3, the region of the Doppler frequency from 0 to 1200 Hz is used to detect the aliasing.

An exemplary embodiment of the present invention calculates the correlation value between the two channel estimation values extracted from the same subframe, and obtains the Doppler frequency value corresponding to the correlation value using the graph of FIG. 3. As a result, when the Doppler frequency falls below 500 Hz, the aliasing does not occur. When the Doppler frequency exceeds 500 Hz, the aliasing is generated. When the Doppler frequency ranges from 200 Hz to 900 Hz, the Bessel function has a high slope value and linearity as shown in FIG. 3. Due to the high slope value and the linearity, the reliability of the aliasing detection is guaranteed even in the low-SNR environment.

According to the aliasing detection result, a final maximum Doppler frequency is determined based on Equation (3).

$$f_d = R - f_d': \text{aliasing}$$

$$f_d = f_d': \text{no aliasing} \quad (3)$$

In Equation (3), $f_d'$ denotes the maximum Doppler frequency estimated according to the PSD peak detection, R denotes the channel estimation value sampling frequency for the PSD peak detection, and $f_d$ denotes the determined final maximum Doppler frequency.

That is, in Equation (3), when the aliasing does not occur, the maximum Doppler frequency estimated according to the PSD peak detection is applied. By contrast, when the aliasing occurs, the maximum Doppler frequency estimated according to the PSD peak detection is corrected according to the channel estimation value sampling frequency and determined as the final maximum Doppler frequency.

Figure 4:
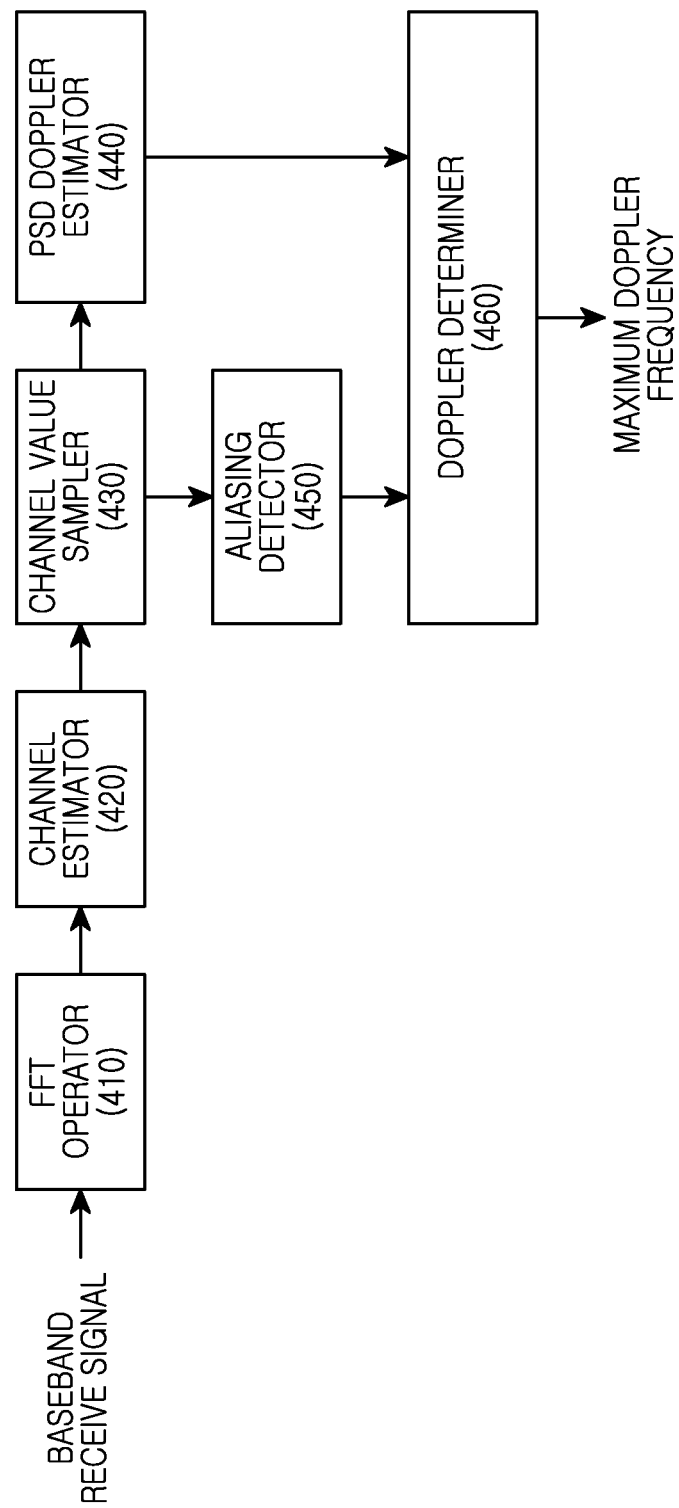
FIG. 4 illustrates a block diagram of a receiver in a mobile communication system according to an exemplary embodiment of the present invention.

FIG. 4 illustrates a block diagram of a receiver in a mobile communication system according to an exemplary embodiment of the present invention.

Referring to FIG. 4, the receiver includes an FFT operator 410, a channel estimator 420, a channel value sampler 430, a PSD Doppler estimator 440, an aliasing detector 450, and a Doppler determiner 460.

The FFT operator 410 converts time-domain OFDM symbols to frequency-domain signals by applying the FFT to the baseband receive signal. That is, the FFT operator 410 restores the signals per subcarrier. The receiver can further include a Radio Frequency (RF) processor, which is not depicted in FIG. 4, for amplifying and down-converting an RF signal received over an antenna and for outputting the baseband receive signal to the FFT operator 410.

The channel estimator 420 receives the subcarrier-based signals of the OFDM symbols from the FFT operator 410 and estimates the channel value of the frequency axis using the pilot of the subcarrier-based signals. In more detail, the channel estimator 420 calculates the channel values at the location of the pilot according to Least Square (LS) or Linear Minimum Mean Square Error (LMMSE), and calculates the channel values of the data subcarrier according to interpolation based on the channel values at the pilot location. The channel value of the frequency axis is generated per OFDM symbol.

The channel value sampler 430 samples some of the frequency-axis channel values of the OFDM symbols output from the channel estimator 420 and provides the sampled channel values to the PSD Doppler estimator 440 and the aliasing detector 450. The sampling frequency of the channel value provided to the aliasing detector 450 is faster than the sampling frequency of the channel value provided to the PSD Doppler estimator 440. For example, the sampling frequency of the channel value provided to the aliasing detector 450 can be double the sampling frequency of the channel value provided to the PSD Doppler estimator 440. Yet, the number of the channel values provided to the aliasing detector 450 is smaller than the number of the channel values provided to the PSD Doppler estimator 440. For example, over one frame, the channel value sampler 430 samples one channel value per subframe and provides the sampled channel value to the PSD Doppler estimator 440, and samples two channel values in the subframes #0 and #5 and provides the sampled channel values to the aliasing detector 450. At this time, when the subframe length is 1 ms, the PSD Doppler estimator 440 receives one channel value per 1 ms and the aliasing detector 450 receives one channel value per 0.5 ms only in the subframes #0 and #5.

The PSD Doppler estimator 440 estimates the Doppler frequency based on the PSD peak detection using the frequency-axis channel values provided from the channel value sampler 430. An exemplary structure of the PSD Doppler estimator 440 is shown in FIG. 5.

Figure 5:
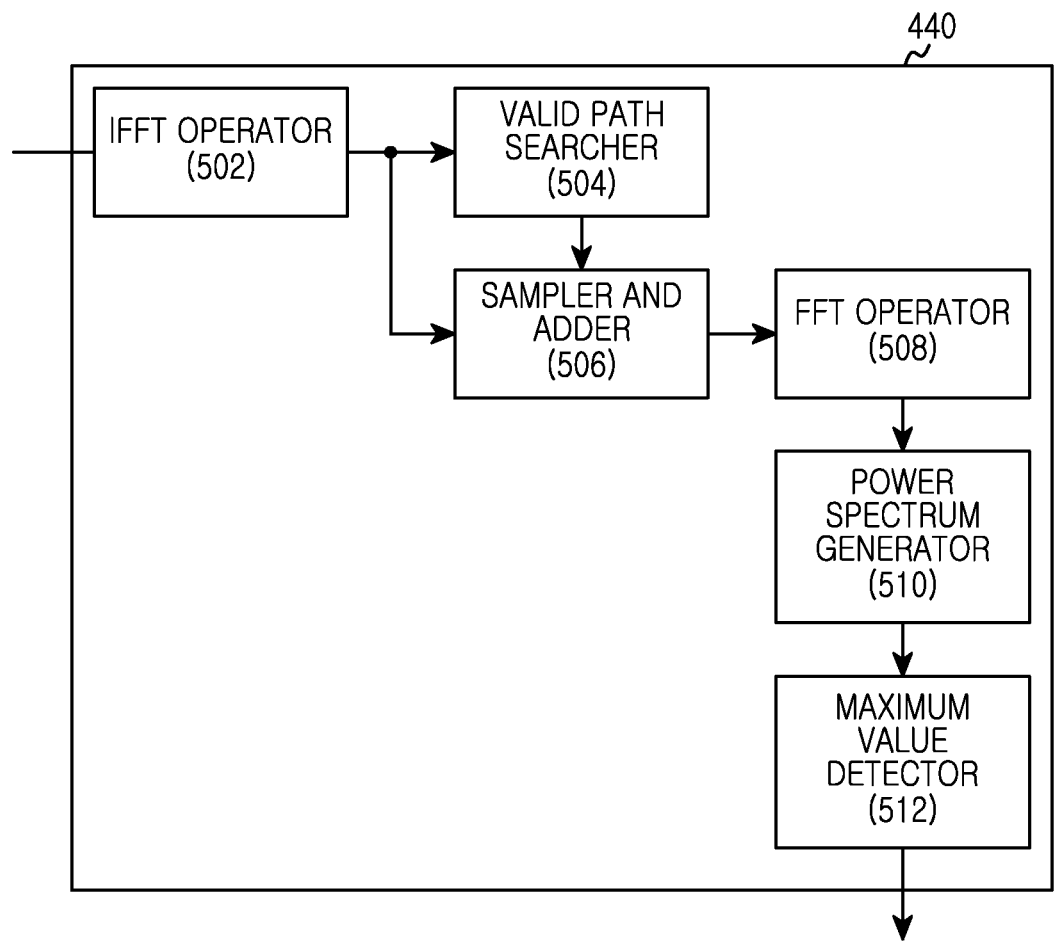
FIG. 5 illustrates a block diagram of a Doppler estimator based on a Power Spectral Density (PSD) peak detection in a mobile communication system according to an exemplary embodiment of the present invention.

FIG. 5 illustrates a block diagram of a PSD Doppler estimator based on a PSD peak detection in a mobile communication system according to an exemplary embodiment of the present invention.

Referring to FIG. 5, the PSD Doppler estimator 440 includes an IFFT operator 502, a valid path searcher 504, a sampler and adder 506, an FFT operator 508, a power spectrum generator 510, and a maximum value detector 512. The IFFT operator 502 converts the frequency-axis channel value to the time-axis channel value, that is, to the impulse response of the channel using the IFFT. The valid path searcher 504 determines the values corresponding to the valid path of the impulse response using the impulse responses of the channel. For example, the valid path searcher 504 calculates the power values by complex-squaring each value of the impulse response, calculates average power values per delay time with respect to the multiple impulse responses, sets a threshold by scaling the maximum value from the average power values, and determines the location of the average power value which is greater than the threshold and becomes the local maxima, as the valid path. The valid path searcher 504 provides at least one index indicating the location of the valid path to the sampler and adder 506.

The sampler and adder 506 samples only at least one valid channel value among the channel values of the impulse response according to the at least one index of the valid path detected by the valid path searcher 504, and adds the sampling value of the delay time of at least one multipath. That is, the sampler and adder 506 generates one channel value per OFDM symbol by adding up one or more valid channel values of the impulse responses of the OFDM symbols. The FFT operator 508 collects N-ary channel values output from the sampler and adder 506 and applies the FFT to the N-ary channel values. Next, the power spectrum generator 510 calculates the power spectrum of the channel by complex-squaring each value of the FFT result. Thereafter, the maximum value detector 512 detects the peak value of the power spectrum and determines the maximum Doppler frequency according to the location of the peak value. For example, the maximum value detector 512 can determine the maximum Doppler frequency by multiplying the index of the frequency axis corresponding to the peak value by the sampling frequency and dividing the product by the FFT size.

The aliasing detector 450 determines whether the aliasing occurs, using the frequency-axis channel values provided from the channel value sampler 430. An exemplary structure of the aliasing detector 450 is shown in FIG. 6.

Figure 6:
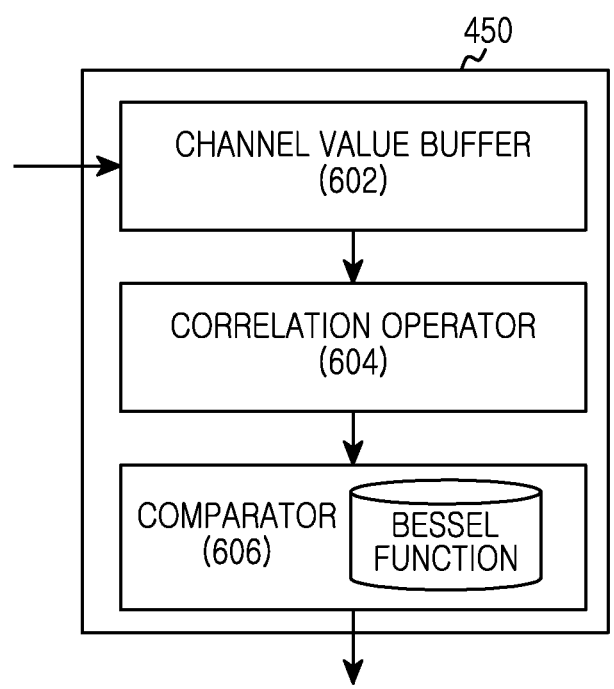
FIG. 6 illustrates a block diagram of an aliasing detector in a mobile communication system according to an exemplary embodiment of the present invention.

FIG. 6 illustrates a block diagram of an aliasing detector in a mobile communication system according to an exemplary embodiment of the present invention.

Referring to FIG. 6, the aliasing detector 450 includes a channel value buffer 602, a correlation operator 604, and a comparator 606. The channel value buffer 602 temporarily stores the frequency-axis channel values fed from the channel value sampler 430. The correlation operator 604 calculates the correlation value of two consecutive frequency-axis channel values of the channel values temporarily stored to the channel value buffer 602. That is, the correlation operator 604 calculates the correlation value of the channel values of the pilots of the same subcarrier. More particularly, the correlation operator 604 calculates the correlation value of two channel values having the time interval shorter than the time interval of the channel values provided to the PSD Doppler estimator 440. For example, the correlation operator 604 calculates the correlation value of two channel values extracted in the same subframe. For example, the correlation operator 604 processes the operation of Equation (2).

The comparator 606 seeks the Doppler frequency value corresponding to the correlation value calculated by the correlation operator 604 using the relationship of a predefined correlation value and the Doppler frequency. Herein, the relationship of the predefined correlation value and the Doppler frequency can be the Bessel function of FIG. 3. For doing so, the comparator 606 can store the Bessel function of FIG. 3, or receive the Bessel function from another component block. The comparator 606 compares the obtained Doppler frequency value and a reference value, and determines the aliasing when the Doppler frequency value is greater. Herein, the reference value can use the maximum Doppler frequency value which can be estimated by the PSD Doppler estimator 440. For example, when one channel value is sampled per subframe of the length 1 ms in order to estimate the Doppler frequency based on the PSD peak detection, the reference value can be 500 MHz. When a plurality of correlation values is calculated over one Doppler frequency estimation region, the comparator 606 utilizes the average of the correlation values. Herein, the Doppler frequency estimation region indicates the time duration where the PSD Doppler estimator 440 estimates the Doppler frequency once.

The Doppler determiner 460 determines the final maximum Doppler frequency according to the maximum Doppler frequency estimated by the PSD Doppler estimator 440 based on the PSD peak detection and the aliasing determined by the aliasing detector 450. When the aliasing does not occur, the Doppler determiner 460 determines the maximum Doppler frequency estimated based on the PSD peak detection, as the final maximum Doppler frequency. By contrast, when the aliasing occurs, the Doppler determiner 460 determines the subtraction value of the maximum Doppler frequency estimated based on the PSD peak detection from the sampling frequency of the channel value used to detect the PSD peak, as the final maximum Doppler frequency. That is, the maximum Doppler frequency temporarily estimated by the PSD Doppler estimator 440 is settled or modified according the aliasing occurrence determined by the aliasing detector 450. In other words, the Doppler determiner 460 determines the final maximum Doppler frequency based on Equation (3).

Figure 7:
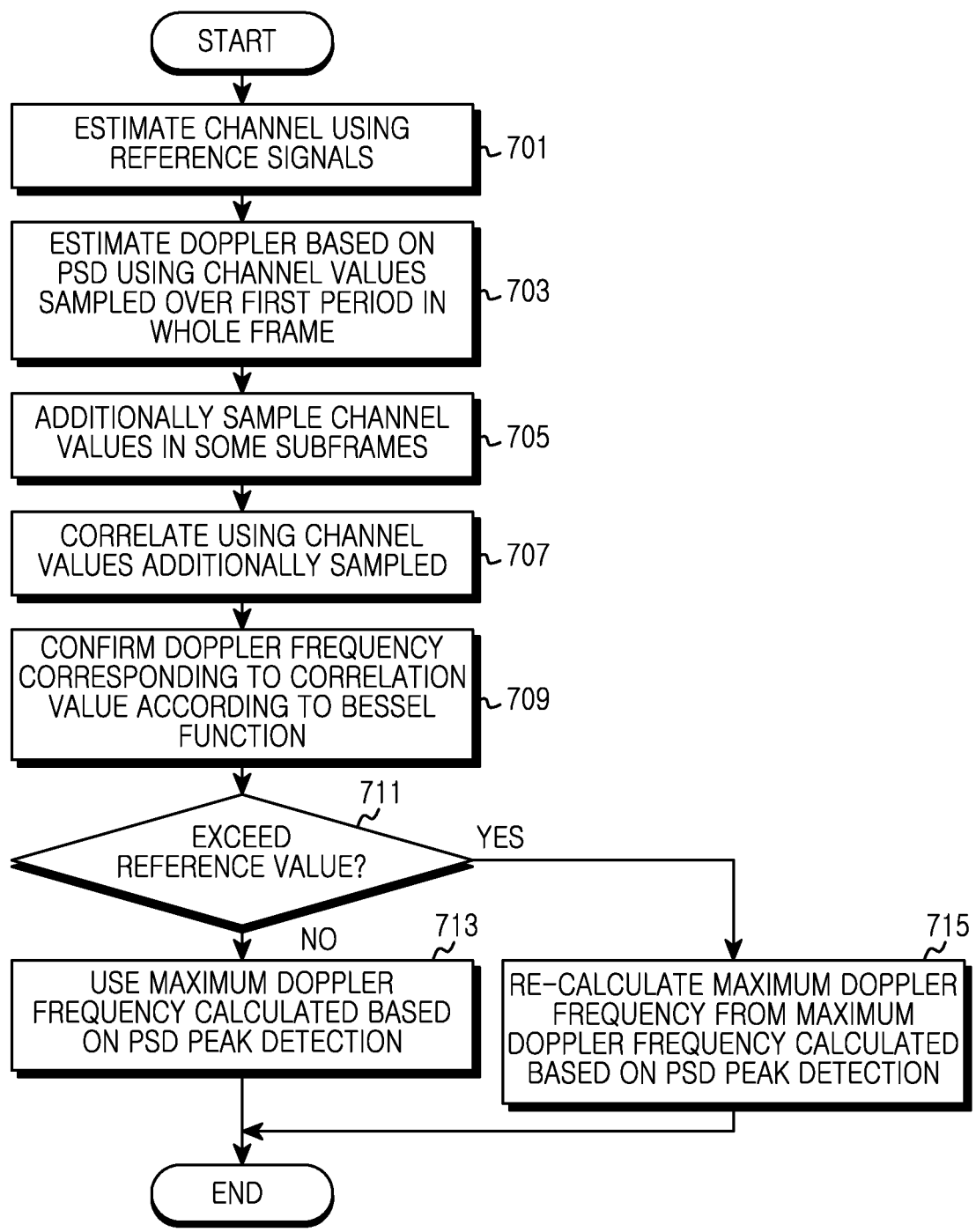
FIG. 7 is a flowchart illustrating operations of a receiver in a mobile communication system according to an exemplary embodiment of the present invention.

FIG. 7 is a flowchart illustrating operations of a receiver in a mobile communication system according to an exemplary embodiment of the present invention.

Referring to FIG. 7, the receiver estimates the channel values using the reference signals in step 701. That is, the receiver determines the frequency-axis channel values per OFDM symbol using the pilots of the reference signal. More specifically, the receiver calculates the channel values at the pilot location, and calculates the channel values of the data subcarriers based on the channel values at the pilot location according to the interpolation.

In step 703, the receiver estimates the Doppler frequency based on the PSD peak detection using the channel values sampled over the first period in the whole frame. For example, the first period can be the subframe. That is, the receiver can sample one channel value per subframe. In more detail, the receiver converts the frequency-axis channel value sampled over the first period to the impulse response using the IFFT, selects the channel values of the valid path, determines one channel value per OFDM symbol by adding up the valid channel values corresponding to the valid path, and calculates the power spectrum of the channel values of the OFDM symbols using the FFT. The receiver detects the peak value of the power spectrum and determines the maximum Doppler frequency according to the location of the peak value.

In step 705, the receiver additionally samples at least one channel value in some subframes. Thus, the receiver obtains at least one channel value pair having the shorter time interval than the channel values used to estimate the Doppler frequency based on the PSD peak detection. For example, when sampling the channel values of the first symbol in each subframe to estimate the Doppler frequency based on the PSD peak detection, the receiver can additionally sample the channel value of the (K/2+1)-th symbol in some of the subframes including K-ary symbols. In this case, the sampling frequency of the channel value pair acquired through the additional sampling is double the sampling frequency of the channel values for the Doppler frequency estimation based on the PSD peak detection.

In step 707, the receiver performs the correlation with the additionally sampled at least one channel value. That is, the receiver calculates the correlation value of the channel value pair having the shorter time interval than the channel values used to estimate the Doppler frequency based on the PSD peak detection. Namely, the receiver calculates the correlation value of the channel values of the pilots of the same subcarrier in the channel value pair. For example, the receiver calculates the correlation value between the two channel values extracted from the same subframe. For example, the receiver performs the operation of Equation (2).

In step 709, the receiver calculates the Doppler frequency value corresponding to the correlation value using the relationship of the predefined correlation value and the Doppler frequency. Herein, the relationship of the predefined correlation value and the Doppler frequency can be the Bessel function of FIG. 3. That is, the receiver stores the Bessel function of FIG. 3. The Bessel function can be stored as at least one of an equation, an approximation, a look-up table, and the like.

In step 711, the receiver determines whether the calculated Doppler frequency value exceeds the reference value. That is, the receiver compares the calculated Doppler frequency value and the reference value. Herein, the reference value can be the maximum Doppler frequency value which can be estimated by the PSD Doppler estimator 440. For example, when one channel value is sampled per subframe of the length 1 ms in order to estimate the Doppler frequency according to the PSD peak detection, the reference value can be 500 MHz. When the plurality of the correlation values is calculated over one Doppler frequency estimation region, the receiver utilizes the average of the correlation values. Herein, the Doppler frequency estimation region indicates the time duration where the Doppler frequency estimation is performed one time based on the PSD peak detection.

When the calculated Doppler frequency value does not exceed the reference value, the receiver determines that the aliasing does not occur and determines the maximum Doppler frequency estimated based on the PSD peak detection in step 703 as the final maximum Doppler frequency in step 713. By contrast, when the calculated Doppler frequency value exceeds the reference value, the receiver determines that the aliasing occurs and newly determines the final maximum Doppler frequency from the maximum Doppler frequency value estimated in step 703, in step 715. For example, the receiver determines the subtraction value of the maximum Doppler frequency estimated in step 703 from the sampling frequency of the channel value used to detect the PSD peak, as the final maximum Doppler frequency. That is, the maximum Doppler frequency temporarily estimated based on the PSD peak detection is settled or modified according to the aliasing occurrence. In other words, the receiver determines the final maximum Doppler frequency based on Equation (3).

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (i.e., software modules), the one or more programs comprising instructions, which, when executed by one or more processors in an electronic device, cause the electronic device to perform a method of the present invention.

Any such software may be stored in the form of a volatile or a non-volatile storage, such as a storage device like a Read Only Memory (ROM), which may be erasable or rewritable, or in the form of a memory such as a Random Access Memory (RAM), memory chips, a device or integrated circuits or on an optically or magnetically readable medium, such as a Compact Disc (CD), a Digital Video Disc (DVD), a magnetic disk or a magnetic tape, or the like. It will be appreciated that the storage devices and storage media are exemplary embodiments of machine-readable storage that are suitable for storing a program or programs comprising instructions that, when executed, implement embodiments of the present invention. Accordingly, exemplary embodiments of the present invention provide a program comprising a code for implementing an apparatus or a method as claimed in any one of the claims of this specification and a machine-readable storage for storing such a program.

As set forth above, when the Doppler frequency is estimated based on the PSD peak detection in the OFDM-based mobile communication system, the aliasing is effectively detected using the Bessel function and the estimation range of the maximum Doppler frequency can be doubled. Therefore, accurate channel information can be provided to a channel adaptation algorithm or an Adaptive Modulation and Coding (AMC) operation.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for estimating a Doppler frequency in a mobile communication system, the apparatus comprising:
   a receiver configured to receive at least one signal for estimating channel values sampled at a first position of each of subframes,
   wherein the receiver is further configured to:
      determine a correlation value between a first channel value sampled at the first position in a subframe among the subframes and a second channel value additionally sampled at a second position in the subframe,
      determine whether aliasing occurs based on the correlation value, and, determine a maximum Doppler frequency based on whether the aliasing occurs,
   wherein the first position comprises a symbol at a start of a subframe, and
   wherein the second position comprises a symbol at a middle of the subframe.

2. The apparatus of claim 1, wherein the receiver is further configured to:

calculate a Doppler frequency value corresponding to the correlation value based on a relationship of correlation values and Doppler frequencies, determine whether the Doppler frequency value exceeds a reference value, determines that the aliasing occurs if the calculated Doppler frequency value exceeds the reference value, and determine that the aliasing does not occur if the Doppler frequency value does not exceed the reference value.

3. The apparatus of claim 2, wherein the relationship is in the form of a Bessel function.

4. The apparatus of claim 3, wherein the Bessel function is stored as at least one of an equation, an approximation, and a look-up table.

5. The apparatus of claim 2, wherein the reference value is a maximum value of Doppler frequencies estimative based on the channel values sampled at the first position of the each of the subframes.

6. The apparatus of claim 1, wherein the receiver estimates a temporal Doppler frequency based on the channel values sampled at the first position of each of the subframes.

7. The apparatus of claim 6, wherein the receiver is further configured to:

determine the temporal Doppler frequency as the maximum Doppler frequency if the aliasing does not occur, and determine a difference value between the temporal Doppler frequency value and a sampling frequency corresponding the first position as the maximum Doppler frequency if the aliasing occurs.

8. The apparatus of claim 1, wherein the receiver is further configured to:

calculate an impulse response of at least one channel by applying an Inverse Fast Fourier Transform (IFFT) to at least one frequency-domain channel value, and calculate a power spectrum of the channel based on the at least one impulse response, and a temporal Doppler frequency according to a peak value location in the power spectrum.

9. The apparatus of claim 1, wherein the receiver is further configured to:

determine whether aliasing occurs comprises an Auto-Correlation-Function (ACF) for calculating a normalized time correlation value of a frequency-domain channel, and estimate the maximum Doppler frequency by applying the correlation value to an inverse Bessel function.

10. A method for estimating a Doppler frequency in a mobile communication system, the method comprising:

receiving at least one signal for estimating channel values sampled at a first position of each of subframes; and determining a correlation value between a first channel value sampled at the first position in a subframe among the subframes and a second channel value additionally sampled at a second position in the subframe;

determining whether aliasing occurs based on the correlation value; and determining a maximum Doppler frequency based on whether the aliasing occurs, wherein the first position comprises a symbol at a start of a subframe, and wherein the second position comprises a symbol at a middle of the subframe.

11. The method of claim 10, wherein the determining of whether the aliasing occurs comprises:

calculating a Doppler frequency value corresponding to the correlation value based on a relationship of a correlation values and the Doppler frequencies;

determining whether the Doppler frequency value exceeds a reference value;

when the Doppler frequency value exceeds the reference value, determining that the aliasing occurs; and when the Doppler frequency value does not exceed the reference value, determining that the aliasing does not occur.

12. The method of claim 11, wherein the relationship is in the form of a Bessel function.

13. The method of claim 12, wherein the Bessel function is stored as at least one of an equation, an approximation, and a look-up table.

14. The method of claim 11, wherein the reference value is a maximum value of Doppler frequencies estimative based on the channel values sampled at the first position of the each of the subframes.

15. The method of claim 10, further comprising: estimating a temporal Doppler frequency based on the channel values sampled at the first position of each of the subframes.

16. The method of claim 15, wherein the determining of the maximum Doppler frequency comprises:

if the aliasing does not occur, determining the temporal Doppler frequency as the maximum Doppler frequency; and if the aliasing occurs, determining a difference value between the temporal Doppler frequency value and a sampling frequency corresponding to the first position as the maximum Doppler frequency.

17. The method of claim 15, wherein the estimating of the temporal Doppler frequency comprises:

calculating an impulse response of at least one channel by applying an Inverse Fast Fourier Transform (IFFT) to at least one frequency-domain channel value;

calculating a power spectrum of the channel based on the at least one impulse response; and estimating the temporal Doppler frequency according to a peak value location in the power spectrum.

18. The method of claim 10, wherein the determining of whether aliasing occurs comprises an Auto-Correlation-Function (ACF) for calculating a normalized time correlation value of a frequency-domain channel, and for estimating the maximum Doppler frequency by applying the correlation value to an inverse Bessel function.

* * * * *